MEMORY SYSTEMS HAVING FLUX LOGIC MEMORY ELEMENTS

Filed Feb. 28, 1961 5 Sheets-Sheet 1

INVENTOR.
GEORGE R. BRIGGS
BY
[signature]
ATTORNEY

Sept. 14, 1965 G. R. BRIGGS 3,206,733

MEMORY SYSTEMS HAVING FLUX LOGIC MEMORY ELEMENTS

Filed Feb. 28, 1961 5 Sheets-Sheet 2

I, II, III, IV - MEMORY ELEMENTS.
V - FRAMING MAGNETIC METAL.
A, B, C - APERTURES.

INVENTOR.
GEORGE R. BRIGGS
BY
Carl V. Olson
ATTORNEY.

INVENTOR.
GEORGE R. BRIGGS
BY
Carl V. Olson
ATTORNEY

INVENTOR.
GEORGE R. BRIGGS
BY
Carl V. Olson
ATTORNEY.

INVENTOR.
GEORGE R. BRIGGS
BY
Carl V. Olson
ATTORNEY.

United States Patent Office 3,206,733
Patented Sept. 14, 1965

3,206,733
MEMORY SYSTEMS HAVING FLUX LOGIC MEMORY ELEMENTS

George R. Briggs, Princeton, N.J., assignor to Radio Corporation of America, a corporation of Delaware
Filed Feb. 28, 1961, Ser. No. 92,263
8 Claims. (Cl. 340—174)

This invention relates to random access memory systems, and more particularly to a planar memory structure made of a plurality of memory elements which are provided with printed windings passing through apertures in the memory elements.

This application is directed to a magnetic memory system operating in an inhibited word selection flux logic mode, while my concurrently filed application Serial No. 92,264 is directed to a magnetic memory system operating in an X–Y selection, inhibited, biased, flux logic mode.

Random access magnetic memory systems are useful in many applications, for example, in high speed electronic computer and data processing apparatus. Memory systems in such apparatus are costly. This is because such a memory system may be required to store a very large amount of randomly accessible information, and because the known high performance memory systems have required laborious and painstaking effort in fabrication, assembly and wiring. For example, large numbers of toroidal cores have been arranged in three-dimensional arrays and threaded with wire conductors. The application of mass production techniques, such as photo-etching and printed wiring techniques, to memory construction has been difficult because the good magnetic characteristics of ferrite materials are often accompanied by undesirable physical qualities, and because the good physical qualities of other magnetic materials are often accompanied by inadequate magnetic characteristics.

It is therefore an object of this invention to provide an improved random access memory construction employing inexpensive and easily handled magnetic sheet material in a mass producible configuration providing high performance memory operation characteristics as regards speed of operation, driving current amplitudes, signal-to-noise ratio, cross talk, ratio of output "1" amplitude to output "0" amplitude and general reliability.

It is another object of this invention to provide an improved planar memory structure which contains a large number of magnetic memory elements and which is relatively easy to manufacture by photo-etching and printed wiring techniques.

It is a further object of this invention to provide an improved planar magnetic memory structure which is small and compact in physical dimensions.

It is a still further object of this invention to provide a memory plane including transfluxor memory elements having an improved arrangment of windings passing through apertures of the memory elements.

It is yet another object to provide an improved magnetic memory system operating in an inhibited word selection flux logic mode.

In one aspect the invention comprises a planar memory structure containing a plurality of magnetic flux logic memory elements constructed of magnetic sheet metal, and printed windings extending through apertures in the elements. In another aspect, the invention comprises a planar memory structure made of a sheet of magnetic material cut away in a pattern defining a plurality of flux logic or transfluxor memory elements each having a first aperture near a first edge, a second aperture near a second opposite edge and a third central aperture. The transfluxor memory elements are systematically arranged in digit columns and word rows with the first edges of adjacent elements near each other and the second opposite edges of adjacent elements near each other. According to a further aspect of the invention, printed inhibit and sense windings extend through certain apertures of all memory elements in a digit column, and printed write and read windings extend through certain apertures of all the memory elements in a word row. In some species, printed bias windings are also provided. The winding schemes of the invention are also applicable to transfluxor memory elements made of ferrite or made of thin magnetic films. According to a feature of the invention, at least some of the printed windings are folded back on themselves to minimize undesired inductance and coupling with other windings.

These and other objects and aspects of the invention will be apparent to those skilled in the art from the following more detailed description taken in conjunction with the appended drawings, wherein.

Referring now in greater detail to the drawings, FIG-

URE 1 shows a flux logic memory element, which advantageously is a transfluxor memory element 10 having a first aperture A near a first edge 12, having a larger aperture B near a second opposite edge 14, and having a third central aperture C. The transfluxor element 10 is preferably constructed, as by photoetching, from an annealed sheet of magnetic metal alloy, such as 4–79 molybdenum permalloy, or 50–50 nickel-iron, or other suitable magnetic metal alloy, having a thickness of 2.0 mils or less. An inhibit winding *i* extends through the first aperture A, a write winding *w* extends through the third central aperture C, and a read winding *r* and a sense winding *s* extend through the second aperture B.

The memory element 10 is preferably constructed with the following relative dimensions. The legs *a*, *b*, *c*, *d* and *e* are of equal dimension, and may be ten mils. The legs *f* are each equal to twice the dimension of the other legs and may be twenty mils. The apertures A and C are equal and may be twenty-two mils on each side. The aperture B is larger and may be twenty-two mils by forty-six mils.

Figure 1:
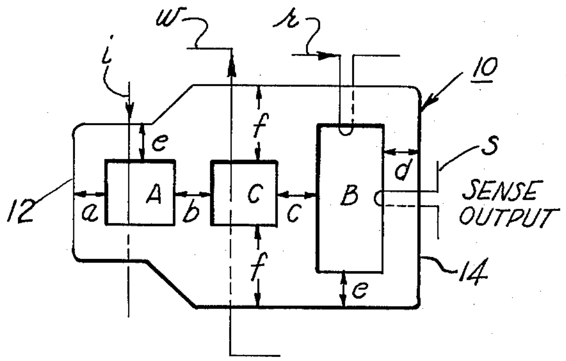
FIGURE 1 is a diagram illustrating a single flux logic or transfluxor memory element having apertures and having winding conductors extending through the apertures in a manner following the teachings of this invention.
Figure 2:
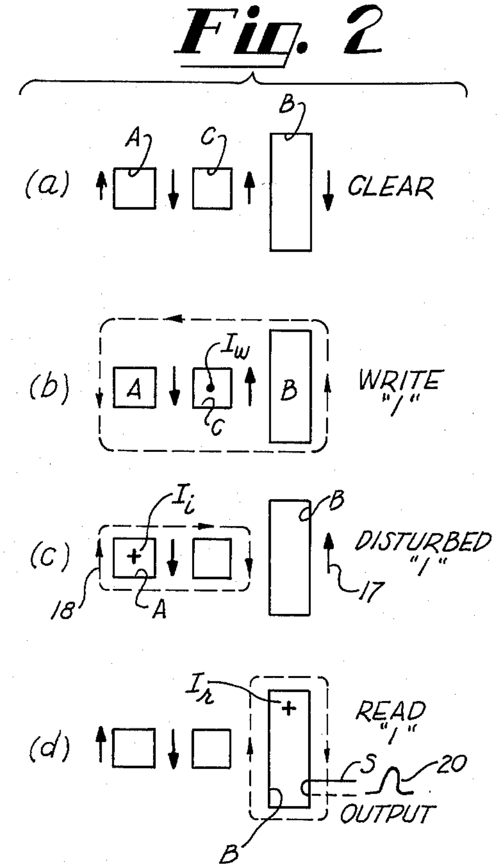
FIGURE 2 is a series of diagrams which will be referred to in describing the operation of the element of FIGURE 1 when a binary "1" is written into and read out of the element.

FIGURE 2 illustrates the ihibited word selection mode of operation of the flux logic or transfluxor memory element 10 of FIGURE 1 when a binary "1" is written into and read out of the memory element. For convenience, the arrows in the various figures will be used to represent the flux in the various legs and the arrow direction indicates the flux direction. The diagram (*a*) of FIGURE 2 illustrates the flux directions around the apertures A, B and C when the memory element is in the clear or "0" state. Diagram (*b*) illustrates the changed condition resulting when a binary "1" is written into the memory element by a current $I_W$ passing up through the aperture C. Diagram (*c*) of FIGURE 2 shows the disturbed "1" condition resulting from an inhibit current $I_I$ passing down through the aperture A. The various "disturb" signals are produced in the memory system operation as the result of selecting an element having a common winding connection with another element. Signals applied to the common windings apply magnetizing forces to each linked element. It is necessary that these signals do not change the information stored in non-selected elements. The disturbed "1" condition produced by the inhibit current $I_I$ still retains the "1" information represented by the counterclockwise flux 17 around the aperture B because the leg carrying the flux 18 is saturated and cannot supply enough flux to change the direction of the flux 17. Diagram (*d*) of FIGURE 2 illustrates how a read out "1" pulse 20 is provided on the sense winding *s* by the passage of a read current $I_r$ down through the aperture B of the memory element. The output pulse 20 results from the reversal of the direction of the flux around the aperture B.

Figure 3:
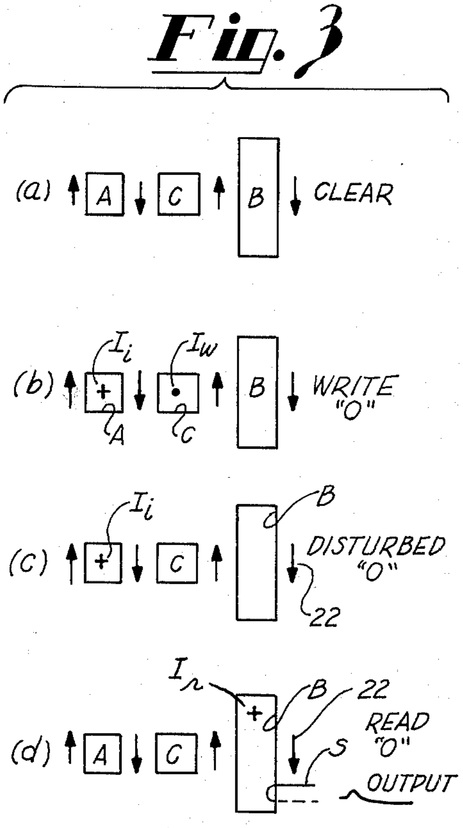
FIGURE 3 is a series of diagrams which will be referred to in describing the operation of the memory element of FIGURE 1 and when a binary "0" is written into and read out of the memory element.

FIGURE 3 shows diagrams illustrating the conditions in the memory element when a binary "0" is written into and read out of the element. Diagram (*b*) of FIGURE 3 shows the storage of a binary "0" in the element by the simultaneous flow of inhibit current $I_I$ down through the aperture A and the flow of write current $I_W$ up through the central aperture C. Since the currents tend to produce flux around apertures A and C in the same directions as the saturated flux which existed in the clear state, there is no change in the flux pattern. There is no reversal of the flux 22 in the leg to the right of aperture B because there can be no increase in the already saturated downward flux between apertures A and C to provide a flux return path. Diagram (*c*) illustrates the fact that a disturbing inhibit current $I_I$, when it appears alone, does not destroy the clockwise flux 22 around the aperture B. This is because the already saturated flux to the left of aperture A cannot be increased by the current $I_I$ to provide a return path for a flux change to the right of aperture A. The diagram (*d*) illustrates the reading out of a stored "0" by the read current $I_r$ passing down through the aperture B. There is no reversal of the clockwise flux 22, and no output pulse is produced on the sense winding *s*.

The operation illustrated in FIGURE 2 of the transfluxor memory element relies on the geometry of the element and, to a lesser degree than heretobefore, on the magnetic characteristics of the material from which the element is made. The memory elements can be made from thin sheets of a magnetic alloy having hysteresis properties, measured about the apertures, which are poorer, with respect to rectangularity, than has been considered necessary or desirable for conventional memory purposes. The flux logic mode of operation provides appreciable discrimination between the "1" and "0" storage states, and avoids loss or alternation of the stored states by disturbs. The operation is not dependent upon the existence of a coercive force or threshold of switching in the magnetic material. Driving pulses of unlimited amplitude can be applied to switch the magnetic flux directions very rapidly. These large amplitude drive pulses permit higher speed operation which is desirable. In general, the larger the amplitude of the drive pulse the faster the element operates. Therefore, the memory elements can be constructed of magnetic metal such as 4–79 molybdenum permalloy having a very small coercive force (0.02 oersted), and such material provides fast switching coefficients (product of switching time and driving field), especially when the sheet material is thin (0.1 to 0.5 mil). Switching coefficients of 0.18 oersted-microsecond have been obtained, and this compares very favorably with the switching coefficients obtained with the best ferrite materials.

The magnetic metal sheet material lends itself to the mass production of planar memory element array structures by photoetching and printed wiring techniques. It is therefore possible, by following the teachings of this invention, to relatively inexpensively produce high performance random access memories. Descriptions of planar memory element array structures follow.

Figure 4:
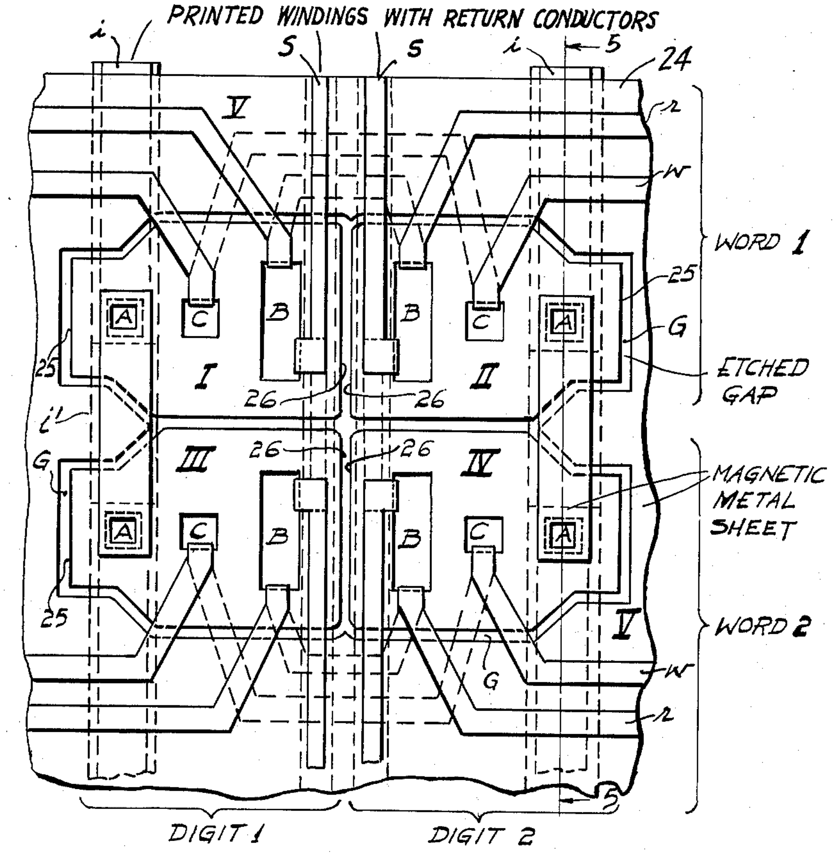
FIGURE 4 shows a fragmentary portion of a planar memory structure made of magnetic metal sheet having gaps cut in the sheet to define four transfluxor memory elements magnetically separated from the remainder of the sheet, and having printed windings extending through apertures in the memory elements.

FIGURE 4 shows a fragmentary portion of a planar magnetic memory structure, the portion including a magnetic metal sheet 24 having narrow gaps G cut therein to define and completely isolate four transfluxor memory elements I, II, III and IV surrounded by the remainder V of the sheet. The elements may be supported in place in a manner described hereinafter. Each transfluxor memory element is provided with a first aperture A near one edge 25, a second larger aperture B near the opposite edge 26, and a third central aperture C. The transfluxor elements are systematically arranged in digit columns and word rows with the edges 26 of adjacent elements near each other. Additional groups (not shown) of four transfluxor elements as shown in FIGURE 4 are systematically repeated on the sheet 24 so that the edges 25 of adjacent memory elements are also near each other.

A printed inhibit winding *i* is provided for each digit column of elements, each inhibit winding being arranged to pass through the apertures A of all transfluxor elements in a digit column. Similarly, each digit column of transfluxor memory elements is provided with a sense winding *s* which passes through the apertures B of all of the elements in a digit column. A printed word read winding *r* passes through all the apertures B of a word row of transfluxor elements. Similarly, a printed word write winding *w* passes through the central apertures C of all elements in a word row.

It will be noted that each winding extends along one surface of the sheet, goes down into an aperture, goes along the opposite side of the sheet, emerges from the corresponding aperture of the next adjacent transfluxor element, and then continues along the first side of the sheet to the next adjacent memory element. The winding scheme is thus seen to be relatively simple and at the same time the winding scheme is one which does not involve an undesired linkage with the magnetic metal sheet material V surrounding the transfluxor elements. The undesired linkage of the surrounding material V is prevented by the geometric arrangement of the storage elements in units or groups of four surrounded by a gap, as illustrated in FIGURE 4, and by the winding scheme whereby each conductor extends down through one storage element and up through an adjacent storage element within the gap. Each winding conductor extends in opposite directions through two apertures which do not have any of the framing or surrounding magnetic material V between them. This avoids a linking with the magnetic material V.

Figure 5:
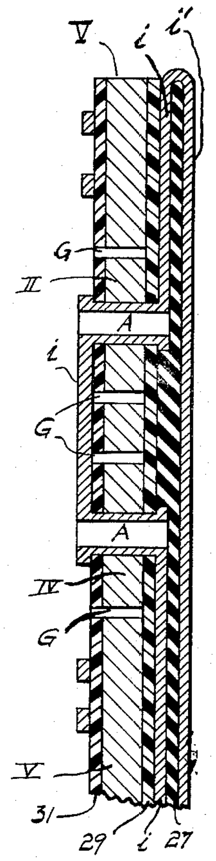
FIGURE 5 is a sectional view taken along the line 5—5 of FIGURE 4.

It will be noted that the geometric arrangement of the transfluxor memory elements I through IV in FIGURE 4 is such that the adjacent inhibit windings *i* and sense windings *s* are separated from each other by a distance corresponding approximately with the distance between the apertures A and B in each element. The geometry is thus such as to physically separate the inhibit and sense windings as much as possible, and to thereby reduce the coupling between the windings. The coupling between the windings is further reduced to a practical minimum by constructing the inhibit and sense windings so that each one is folded back on itself. This construction, which minimizes mutual inductance, is clear from FIGURE 5 which is a sectional view taken along the lines 5—5 of FIGURE 4. FIGURE 5 shows the inhibit winding *i* going through the apertures A of transfluxor elements II and IV, and shows the folded back part *i'* of the inhibit winding separated from the main portion *i* by an insulating layer 27. The magnetic fields from the two parts tend to cancel.

Briefly, the memory sheet 24 may be constructed by coating both sides of a magnetic metal sheet (such as 4–79 molybdenum permalloy) with a photoresist. The photoresist 29 on one side of the sheet is exposed in a pattern defining the apertures A, B and C, and the photoresist 31 on the other side of the sheet is exposed in a registered pattern also defining the apertures A, B and C, and also the gaps G defining the outlines of the memory elements. The photoresist is then developed, and the magnetic metal sheet is etched to provide a plurality of magnetically isolated transfluxor memory elements supported in relation to each other and in relation to the remainder V of the sheet by means of an insulating substrate constituted by the photoresist 29 on one side of the sheet, and to provide apertures A, B and C extending through the transfluxor elements and the layers of photoresist on both sides thereof. The surfaces of the sheet and the insides of the apertures A, B and C are then coated with an insulating material (not shown in FIGURES 4 and 5 for reasons of clarity of illustration). Thereafter, the windings are printed on the insulated sheet in the configurations illustrated in FIGURES 4 and 5.

Figure 6:
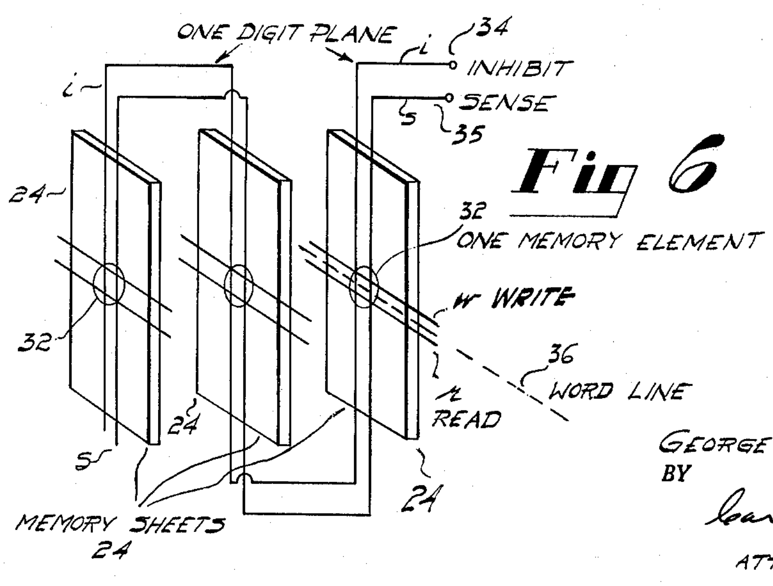
FIGURE 6 is a representation of three planar memory structures illustrating the manner in which a plurality of memory structures may be employed in constructing a memory system.

FIGURE 6 illustrates how a large number of memory sheets 24 may be organized to provide a complete memory unit. In FIGURE 6, each memory sheet 24 is shown as including one memory element 32 (shown for simplicity in outline, and without the individual apertures) linked by a column inhibit winding *i*, a column sense winding *s*, a row write winding *w* and a row read winding *r*. It should be understood that the windings mentioned also link all the other memory elements (not shown) in the respective columns and rows. The inhibit windings *i* shown on the three memory sheets 24 link elements which define a digit plane. The windings *i* are connected together in a series circuit having an inhibit terminal 34. All the sense windings *s* in the one illustrated digit plane are also connected in series to a sense terminal 35. The dashed word line 36 represents that one stored word exists in all the memory elements arranged along a row on a single memory sheet 24. A word is written in the word line 36 by energizing the write winding *w* and by simultaneously energizing the inhibit windings *i* in all the digit planes (only one of which is shown) in which it is desired to write a "0." The coincidence of a write current and an inhibit current at one memory element writes a "0," and a write current alone writes a "1." The word in the word line 36 is read out by energizing the read winding *r* with the result that the information in each memory element of the word line 36 is delivered to sense windings *s* in respective digit planes. It is thus apparent that a word is stored in the memory elements located in a single word row on a single memory sheet 24.

Figure 7:
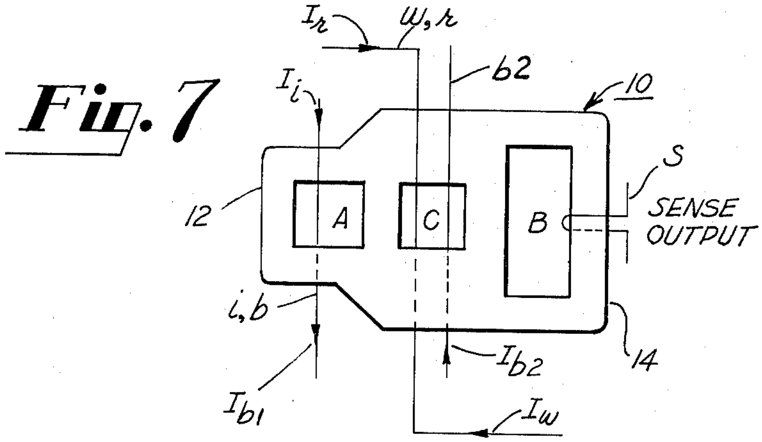
FIGURE 7 is a diagram illustrating a single flux logic or transfluxor memory element having apertures and having winding conductors, including bias winding conductors, extending through the apertures.

FIGURE 7 shows a flux logic memory element or transfluxor memory element 10 adapted for a fixed bias mode of operation. A combination inhibit and bias winding i,b extends through aperture A and carries currents $I_i$ and $I_{b1}$ in the same direction indicated by the arrows. A combination write and read winding w,r extends through the central aperture C for the purpose of conducting currents $I_r$ and $I_w$ in the different directions indicated by the arrows. The central aperture C is also provided with a printed winding *b2* through which a current $I_{b2}$ is made to flow. An output signal is sensed on a sense winding *s* extending through the second aperture B.

Figure 8:
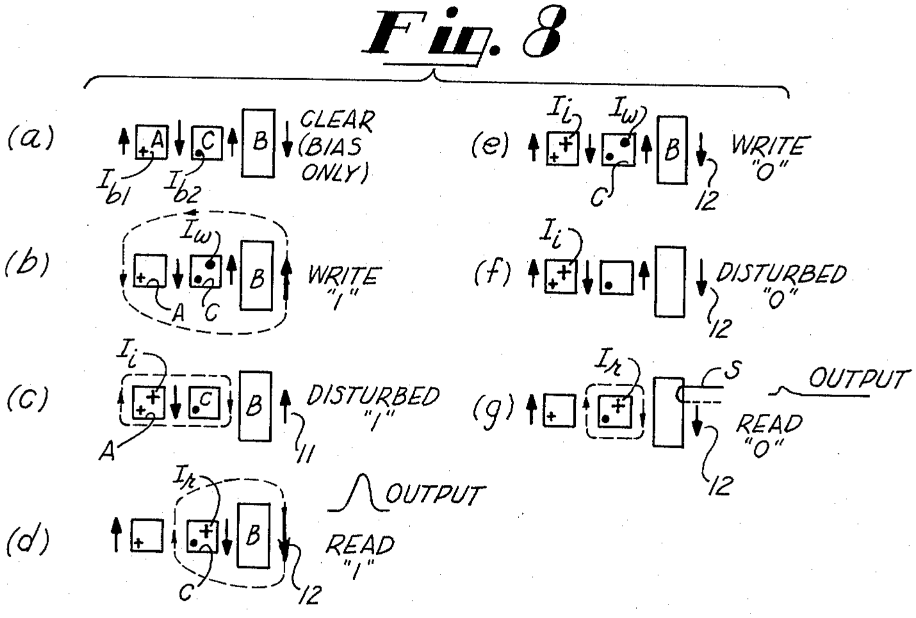
FIGURE 8 is a series of diagrams which will be referred to in describing the operation of the memory element of FIGURE 7 when a binary "1" is written into and read out of the element, and when the binary "0" is written into and read out of the memory elements.

FIGURE 8 illustrates the biased inhibited word selection mode of operation of the flux logic or transfluxor memory element 10 of FIGURE 7. The diagram (*a*) of FIGURE 8 illustrates the directions of the flux around the three apertures when the memory element is in the clear condition with only bias currents $I_{b1}$ and $I_{b2}$ flowing in the windings in apertures A and C. Diagram (*b*) of FIGURE 2 illustrates the effect of a write current $I_w$ flowing up through the central aperture C. It will be noted that the write current $I_w$ causes a flux reversal so that the flux 11 represents a stored "1" in the memory element. The diagram (*c*) illustrates the disturbed "1" state wherein an inhibit current $I_i$ causes flux reversals in some legs but does not change the flux 11 representing the "1." The inhibit current $I_i$ is unable to change the flux 11 around aperture B because it flows in the aperture A which is remote from the output aperture B, and the amount of flux produced is limited by the leg of the memory element to the left of the aperture A. Diagram (*d*) shows the generation of an output pulse representing the stored "1" when a read current $I_r$ is applied through the aperture C. The read-out operation results in a reversal of the flux around the aperture B to the direction of the arrow 12.

The diagram (*e*) of FIGURE 8 illustrates the manner in which a "0" is written into the memory element by the simultaneous application of an inhibit current $I_i$ through the aperture A and a write current $I_w$ in the opposite direction through the central third aperture C. The inhibit current $I_i$ prevents the write current $I_w$ from reversing the direction of the flux 12. It is thus apparent that a "0" is written by the simultaneous application of inhibit and write currents, and that a "1" is written by the sole application of a write current. Diagram (*f*) illustrates the fact that the sole application of an inhibit current $I_i$ is unable to reverse the direction of the flux 12 which represents the stored "0." Diagram (*g*) illustrates the reading out of the stored "0" by the read current $I_r$ which is also unable to reverse the direction of the flux 12. The absence of an output pulse on the sense winding *s* indicates that the stored bit was a "0."

The biased word selected inhibited flux logic memory system illustrated in FIGURES 7 and 8 is one wherein the bias currents $I_{b1}$ and $I_{b2}$ are continuously supplied to provide a threshold which the writing current $I_w$ and the reading current $I_r$ must exceed before they can be effective in changing the flux in the memory element. The bias currents are typically made a small fraction, such as 10 percent, of the write and read currents. The bias currents bias the memory elements in such a direction that small disturbing write and read currents (as, for example, disturbs produced by imperfect word selection switches) do not cause partial or full switching of the element. The advantage of using the bias currents arises from the fact that the magnetic metal sheets from which the magnetic memory elements are constructed exhibit low coercive forces. Therefore, a number of small disturbs in the write and read windings, even where each disturb is only a few percent or so of the write or read current, can otherwise produce a gradual change in the flux state of a memory element. A reading disturb tends to produce the "0" state in the element, and a writing disturb tends to cause the "1" state in the element.

It will be noted from the diagrams of FIGURE 8 that the bias current $I_{b1}$ is in a direction to oppose and provide a threshold for the writing current $I_w$. It will also be noted that the bias current $I_{b2}$ is in a direction to oppose and provide a threshold for the reading current $I_r$. However, the bias current $I_{b1}$ to some extent cancels or detracts from the effectiveness of the bias current $I_{b2}$ in providing a threshold for the read current $I_r$. For this reason, the bias current $I_{b2}$ provided to the bias winding *b2* is made greater than the bias current $I_{b1}$ by a factor such as two.

Figure 9:
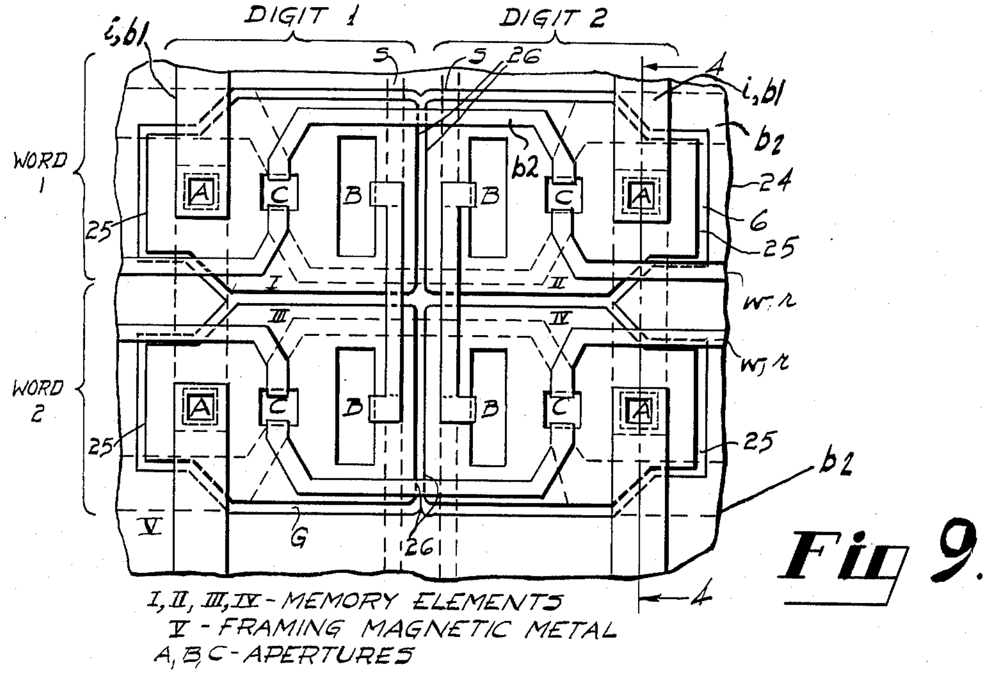
FIGURE 9 shows a fragmentary portion of a planar magnetic memory structure including memory elements with printed windings following the scheme of FIGURE 7.

FIGURE 9 shows a fragmentary portion of a planar memory structure following the winding scheme of FIGURE 7. A printed inhibit and bias winding *b1* is provided for each digit column of elements, each winding being arranged to extend through the apertures A of all transfluxor elements in a digit column. Similarly each digit column of transfluxor memory elements is provided with a sense winding *s* which extends through the second apertures B of all the elements in a digit column. A printed bias winding *b2* extends through all the central apertures C of all the memory elements in a row. A printed common write and read winding w,r is provided for each word row of memory elements and it is arranged to extend through the central apertures C of all the elements in a row.

Figures 10, 12:
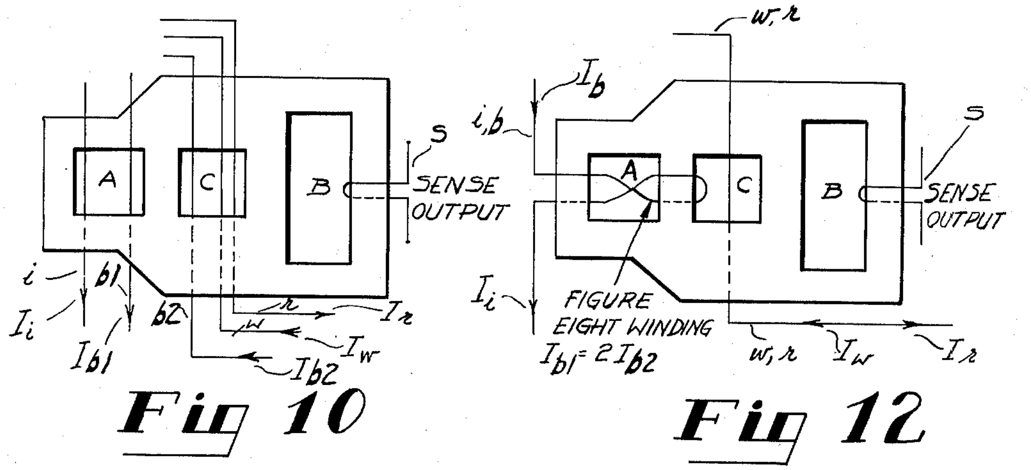
FIGURE 10 is a diagram illustrating a single flux logic or transfluxor memory element having apertures, and having windings, including independent bias, read and write conductors, extending through the apertures.
FIGURE 12 is a diagram of a single flux logic or transfluxor memory element having apertures through which windings pass in still another fashion.
Figure 11:
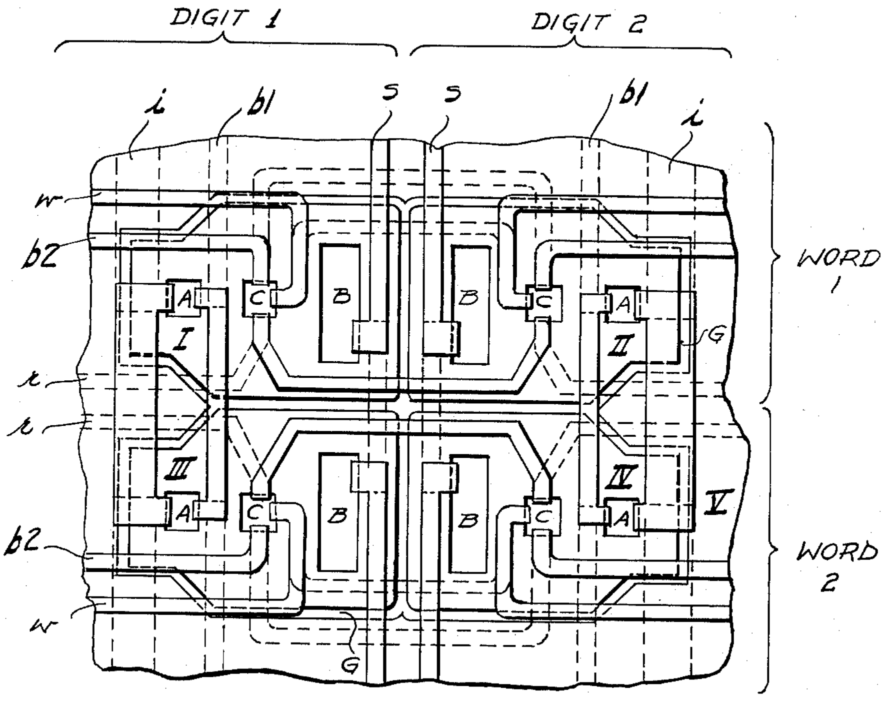
FIGURE 11 is a fragmentary portion of a planar magnetic memory structure including four magnetic memory elements having windings according to the organization illustrated in FIGURE 10.

FIGURES 10 and 11 show another winding arrangement which differs from the arrangements of FIGURES 7 and 9 in that separate printed windings *i* and *b1* are employed for the respective inhibit current $I_i$ and the bias current $I_{b1}$. The arrangement of FIGURES 10 and 11 also differs in that separate read and write windings *r* and *w* are employed in place of the single conductor of the previously described arrangement. The use of separate read and write windings *r* and *w* involves an increased complication in the fabrication of the memory sheet, but it provides an economy in the associated circuitry because simple unidirectional current sources for the read and write currents may be employed. The previously described arrangement wherein a single conductor is employed requires more complicated bi-directional switch circuits.

FIGURE 11 is a printed winding configuration by means of which the additional conductors can be provided while avoiding any undesired linking of the windings with the surrounding or framing sheet material V.

Figure 13:
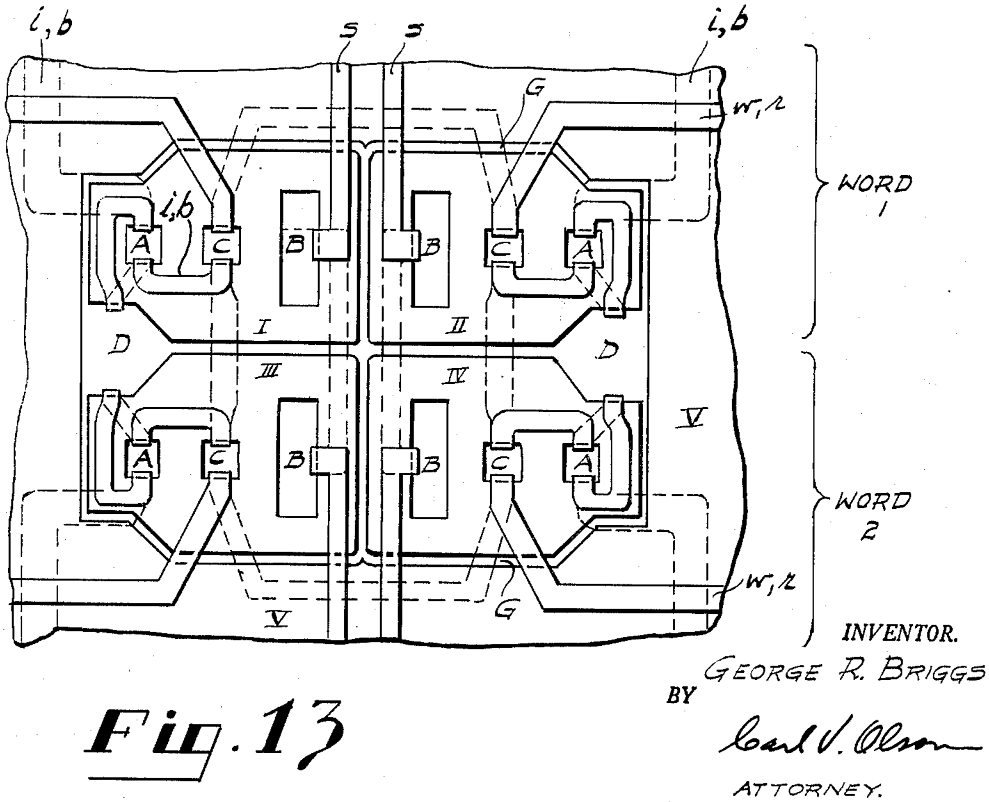
FIGURE 13 is a diagram of a fragmentary portion of a planar magnetic memory structure having four transfluxor memory elements provided with windings according to the scheme illustrated in FIGURE 12.

FIGURES 12 and 13 illustrate still another arrangement wherein a single printed conductor i,b is employed for the inhibit current $I_i$ and the bias current $I_b$. The conductor i,b extends through both apertures A and C. This multipurpose winding i,b is printed in a figure-eight pattern which extends through the aperture A twice and extends through the aperture C once. The result of this configuration is to provide twice as much bias in the aperture A as in the aperture C. The desirability of this result was decribed in connection with FIGURES 7 and 9.

FIGURE 13 shows a portion of a planar magnetic memory structure with a group of four magnetic memory elements and with printed windings conforming to the scheme illustrated in FIGURE 12. FIGURE 13 illustrates a feature of the invention not present in the previously described arrangements, namely the feature of employing auxiliary apertures D as well as main apertures A, B and C. The composite winding i,b is a figure-eight winding and it is printed in such a way as to pass through auxiliary apertures D, as well as through the main apertures A and C. The auxiliary apertures D are formed in the same manner as the main apertures A, B and C are formed. By providing auxiliary apertures D for the windings i,b it is possible to avid the linking of the framing magnetic material V by the windings, and at the same time to retain the manufacturing advantages of the construction wherein the memory sheet consists of a magnetic metal sheet with gaps G cut therein to define the individual memory elements.

Memories constructed according to the teachings of this invention can be switched in a time in the range between 0.01 and 15 microseconds. The fabrication of many memory elements from a magnetic metal sheet is simpler and less expensive than the fabrication of any array of a comparable number of ferrite core memory elements, and yet the magnetic sheet memory provides equally good operating characteristics as regards driving current amplitudes, and superior characteristics as regards speed of operation and signal-to-noise ratios. The magnetic memory sheets can be stacked close together to provide a compact memory capable of storing 500,000 bits per cubic inch.

The schemes herein described for linking through the apertures of the magnetic metal transfluxor memory elements with winding conductors, however, may also be advantageously applied to transfluxor memory elements made of other magnetic material such as ferrite.

What is claimed is:

1. A planar memory structure comprising a sheet of magnetic material cut away in a pattern defining a plurality of transfluxor memory elements each having a first aperture near a first edge, a second larger aperture near a second opposite edge, and a third central aperture, said elements being systematically arranged in digit columns and word rows with the first edges of two adjacent elements near each other and the second opposite edges of two adjacent elements near each other, and printed windings passing through the apertures in said memory elements.

2. A memory structure as defined in claim 1 wherein said sheet of magnetic material is a sheet of magnetic metal alloy.

3. A memory structure as defined in claim 1 wherein said magnetic sheet is cut away in a pattern such that narrow gaps outline said transfluxor elements leaving some magnetic sheet framing material, and wherein insulating material is employed to bridge said gaps and mechanically maintain said elements in said systematic arrangement.

4. A memory structure as defined in claim 3 wherein said insulating material is photoresist.

5. A memory structure as defined in claim 1 wherein each of said windings extends from an aperture on one transfluxor element along one side of said sheet to and through the corresponding aperture in the next adjacent transfluxor element, and then extends along the other side of the sheet to the corresponding aperture of the next following transfluxor element.

6. A memory structure as defined in claim 5 wherein an insulating layer is provided on at least the portion of at least one of said windings that is on one side of said sheet, and wherein said winding is folded back on itself over said insulating layer to minimize undesired inductance and coupling with other windings.

7. A planar memory structure comprising a plurality of transfluxor memory elements each having a first aperture near a first edge, a second larger aperture near a second opposite edge, and a third central aperture, said elements being systematically arranged in digit columns and word rows with the first edges of adjacent elements near each other and the second opposite edges of adjacent elements near each other, a printed inhibit winding and a printed sense winding for each digit column of elements, each inhibit winding passing through the first apertures of all elements in a column and each sense winding passing through the second apertures of all elements in a column, and a printed word read winding and a printed word write winding for each word row of elements, each read winding passing through the second apertures of all elements in a row and each write winding passing through the third central apertures of all elements in a row.

8. A memory structure as defined in claim 7 wherein said transfluxor elements are arranged in groups of four elements each, and wherein the word row windings are located between the groups of elements.

References Cited by the Examiner

UNITED STATES PATENTS

| | | | |
|---|---|---|---|
| 2,917,238 | 12/59 | Blizard. | |
| 2,923,923 | 2/60 | Baker | 340—174 |

| | | | |
|---|---|---|---|
| 2,926,342 | 2/60 | Rogers | 340—174 |

OTHER REFERENCES

1/61—Marcy and Councill, "IMB Technical Disclosure Bulletin," vol. 3, No. 8.

IRVING L. SRAGOW, *Primary Examiner.*

JOHN F. BURNS, *Examiner.*